Jan. 26, 1954

J. S. CLARKE
BELLOWS TYPE EXPANSION JOINT AND
EQUALIZING SUPPORT THEREFOR
Filed Dec. 31, 1949

2,667,370

James S. Clarke Inventor
By J. K. Amall Attorney

Patented Jan. 26, 1954

2,667,370

UNITED STATES PATENT OFFICE 2,667,370

BELLOWS TYPE EXPANSION JOINT AND EQUALIZING SUPPORT THEREFOR

James S. Clarke, East Orange, N. J., assignor to Standard Oil Development Company, a corporation of Delaware Application December 31, 1949, Serial No. 136,359

4 Claims. (Cl. 285—90)

1

The present invention relates to flexible pipe joints and, more particularly, to a bellows-type expansion joint adapted for disposition between the end portions of adjoining conduit sections in a conduit line. The invention further relates to a bellows-type expansion joint, including a pantograph frame support therefor.

In constructional engineering, provision has to be made for the dimensional changes occurring in supporting steel and to piping due to temperature variations. The expansive and contractive movements, in the piping of process equipment must, moreover, be absorbed in the system without causing such strains as may subsequently lead to breakage or leakage in the equipment.

It is an object of the invention to provide a bellows-type expansion joint structure for a conduit system, in which total axial movement of the joint is equally distributed among a series of component bellows members therein. It is also an object of the invention to provide support for the joint which will resist lateral movement induced by any tendency for the bellows members to sag, with the joint disposed horizontally, and also one which will limit and control longitudinal or axial movement of the joint components.

The invention and its objects may be more fully understood from the following description when read in conjunction with the accompanying drawings, in which.

Figure 1:
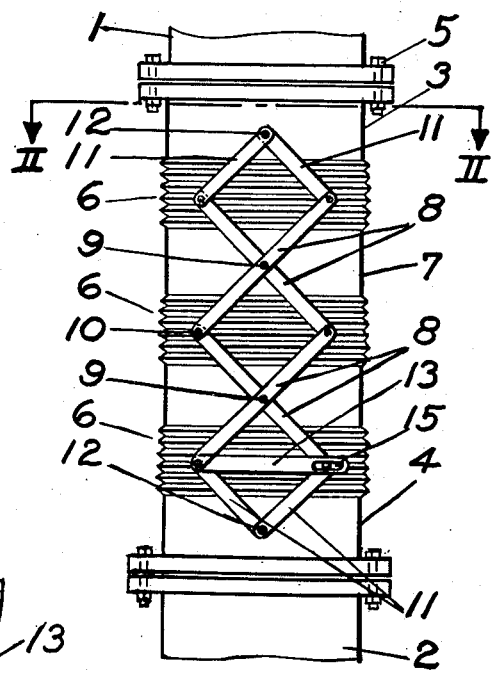
Fig. 1 is a side elevation of a bellows-type expansion joint, according to the invention.

In the drawings, the numerals 1 and 2 designate the opposed end portions of two spaced, adjoining, conduit sections. Numerals 3 and 4 designate opposite rigid end portions of a bellows-type expansion joint member. As shown in Fig. 1, the conduit end portions, and the end portions of the expansion joint are flanged and arranged for connection in the manner shown, as by means of bolts 5.

The expansion section of the joint is provided

Figure 2:
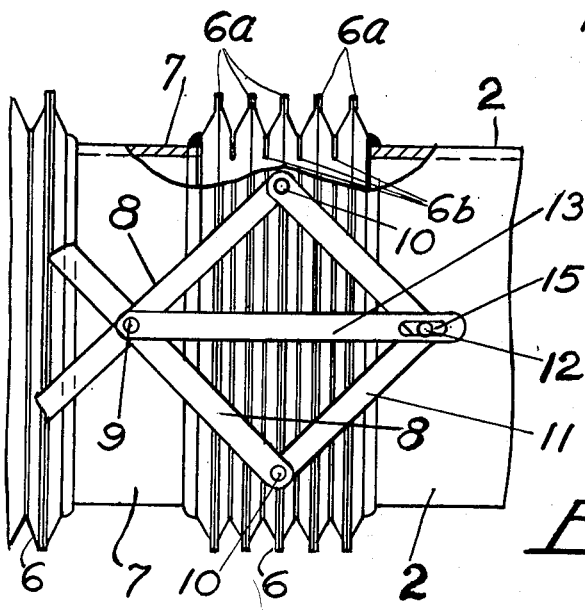
Fig. 2 is an enlarged side elevation of a portion of the joint illustrated in Fig. 1, partly in section, showing a joint in which the end bellows member of a series is attached directly to a conduit section end, the construction of one suitable type of bellows member, and an alternate form of limit stop against axial movement.

2 by means of bellows members 6. In the form shown, these members consist of a series of flexible annular discs joined one to another alternately at outer and inner peripheral edges 6a and 6b respectively, but any conventional form of bellows element may be substituted. Two or more bellows members may be employed, depending upon the extent and character of the movement to be provided for. The joint may also be modified to the extent that the end portions 3 and 4 may be omitted, and opposite end surfaces of the outermost bellows members, in the joint between the conduit ends 1 and 2, may be secured directly to such ends in any convenient fashion, such as by welding as shown in Fig. 2. As illustrated in the drawings, the joint is composed of a series of individual bellows members 6, one bellows member being attached to another by means of intermediate, rigid, tubular spacer elements 7, the opposed ends of the spaced bellows members being attached to opposite ends of the elements 7.

Exteriorly of the joint thus constructed is provided a pantograph frame support. This support is of substantially typical pantograph construction composed of a series of regular, four-sided support frame members each having parallel side portions, the several members being arranged in pivotal corner to corner relationship along a line extending longitudinally of the joint, in parallel relationship to the axis thereof, and diagonally through the frame members. In the form of the invention illustrated, the support includes an intermediate frame member and two end frame members. Intermediate members are formed by narrow, elongated link elements 8, pivotally attached, in pairs, at a center point, as at 9, to form a generally X-shaped unit. Free ends of each X unit are in turn pivotally attached, as at 10, to free ends of an adjoining unit to form one or more intermediate frame members. The unattached ends of the endmost X units of the intermediate member or members, are each pivotally attached to one end of one of a pair of half link elements 11, and the opposite ends of the pair of these half link elements pivotally joined to each other, as at 12, to form end frame members similar to the intermediate members.

With the joint in a neutral or unstressed position, the frame support, as a unit is pivotally attached at each end to a conduit end section, or to the rigid end portions 3 and 4 respectively. The support is also pivotally attached to each spacer element 7 at a center point junction of each pair of link elements 8 coinciding with said elements 7, and in a line longitudinally of the joint, diagonally through the frame members. The means for pivotal attachment of the support frame to the end portions 3 and 4, and to the elements 7, may be combined with the pivotal attachment of the link elements at 12 and 9 respectively, either by means of studs mounted integrally on the end portions 3 and 4, and elements 7, or by using elongated bolts for joining the link elements.

Where the joint includes not more than two bellows members with a single intermediate spacer element 7, the pantograph frame support may consist of a single pair of elements 8 pivotally attached at a center point such as at the point 9, with the free ends of the X-shaped unit thus formed each pivotally attached to a half link element 11. These half link elements 11, when joined in the manner shown in Figs. 1 and 2, form with the X-shaped unit a single pair of support frame members, providing a minimum pantograph structure. Also, whereas it is preferable to provide one frame member for each bellows expansion element in the joint, this may be increased in any desired fashion so long as in the assembly each spacer element 7 may be pivotally secured to a corner junction between frame members in the support.

Figure 3:
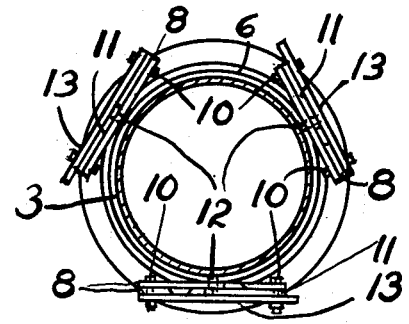
Fig. 3 is an end elevation of a joint member taken along the line II—II of Fig. 1.
Figure 4:
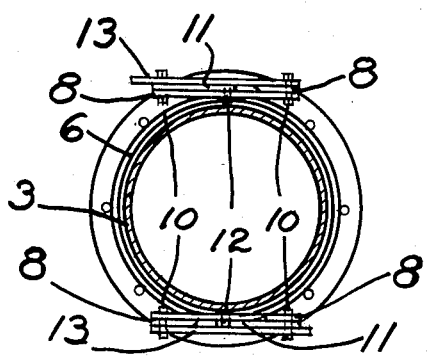
Fig. 4 is a similar view of another form of the joint illustrated in Figs. 1 and 2.

Depending upon the conditions of service to be experienced, one or more pantograph frame supports may be provided. Preferably, at least two such supports will be employed, the supports being disposed exteriorly of the joint in spaced relation peripherally thereof, and one support equidistant from another. Figure 4 illustrates the disposition and relationship one to another of two pantograph frame supports, while Fig. 3 illustrates a similar relationship where a series of three such supports is employed. In the construction illustrated by Fig. 4, the supports are spaced one from another by 180° and in the construction illustrated by Fig. 3, they are spaced one from another by 120°.

Where it is desirable to limit extension or compression of the joint, a travel limit stop element 13 may be provided for one or more of the frame support elements. As shown in Fig. 1, such a stop element is a narrow, elongated link member or strap pivotally secured at one end to a corner of a frame element and extends diagonally across the frame element into slidably pivotal relationship to an opposite corner. The strap 13 is of a length somewhat greater than the diagonal distance between two corners of the frame member with the joint in a neutral or unstressed position, and the slot 15 is formed so that when the strap member may be pivotally secured to the frame member, the pivot point normally will be disposed equi-distant from the ends of the slot, thus permitting an equal distance for extension or compression of the joint between stop limits. If desired, however, the slot may be otherwise disposed so as to provide greater movement of the joint in either compression or extension. Also, as shown in Fig. 1, the stop element 13 is disposed at substantially right angles to a line through the points of pivotal attachment of the frame support to the rigid elements of the joint. Where desired, however, the stop may be disposed in the same line with the points of pivotal attachment of the support to the joint, as in Fig. 2, and substantially equivalent results obtained.

In operation, as the conduit expands or contracts due to temperature changes, the joint is compressed or extended by the resulting movement of the conduit sections. This movement transmitted to the joint is equalized from end to end thereof by the resulting collapse or extension of the pantograph frame support. An inherent characteristic of the pantograph construction is that the shape of all frame members is altered as the shape of any one member is altered. Thus, when movement of one or both of the adjoining conduit section ends tends to compress or extend the joint, such movement is transmitted to the pantograph frame support, and tends to collapse or extend the several frame members to an equal degree. Because of the attachment of intermediate frame members to the intermediate rigid spacer elements, such collapse, or extension of the frame members, is in turn compensated for by equal and equivalent axial movement of each of the flexible bellows members. The total extent of movement in the joint is thus divided among all the bellows members simultaneously, rather than individually and consecutively. Furthermore, when the joint is disposed in a vertical position, the ends of the pantograph frame support being restrained by connection to the portions 3 and 4, or to the conduit section ends, 1 and 2, the weight of the intermediate bellows members and spacer elements is supported by the pantograph frame support through the connections thereof to the spacer elements, and uncontrolled collapse or extension of the bellows members is prevented.

What is claimed is:

1. In an expansion joint of the character described, for connection between the opposed end portions of two adjoining conduit sections, an assembly comprising a series of at least two tubular, multi-unit bellows-type conduit expansion members, separately disposed between said conduit sections coaxially therewith and with each other, means for securing the outer ends of the outermost expansion members in said series in fluid-tight conduit connection with respective opposed end portions of said adjoining conduit sections, a rigid, pipe-like tubular, spacer element disposed intermediate the opposed ends of adjoining expansion members in said series and coaxially therewith, said spacer element secured at each end to one of the opposed ends of said separate adjoining expansion members in coaxial, fluid-tight conduit connection therewith, whereby said spacer element forms a portion of a fluid flow path between the adjoining conduit sections and means for supporting said joint, and equally distributing total axial movement of said joint among the individual members of said series of expansion members, including at least one pantograph frame member in which a series of cross-link elements are pivotally interconnected in series at a mid-point of each pair and at their ends, said pantograph frame member disposed exteriorly of the joint and pivotally secured at each end with reference to a conduit section end portion and to each rigid spacer element at a mid-point of a pair of said cross-link elements, said member extending longitudinally of the joint between said conduit end portions.

2. An expansion joint according to claim 1, in which the means for supporting said joint and for equally distributing total axial movement thereof among said expansion members comprises a plurality of said closed end pantograph frame members disposed in spaced relation circumferentially of the joint.

3. An expansion joint according to claim 2, in which said means for supporting the joint and for equally distributing total axial movement thereof among said expansion members comprises two closed end pantograph support members disposed in opposed relation diametrically of said joint.

4. An apparatus according to claim 2, in which said means for supporting said joint and for equally distributing total axial movement thereof among said expansion members comprises three closed end pantograph members disposed in equally spaced relation one to another circumferentially of said joint.

JAMES S. CLARKE.

References Cited in the file of this patent

UNITED STATES PATENTS

| Number | Name | Date |
|---|---|---|
| 828,709 | Buckland | Aug. 14, 1906 |
| 2,314,776 | Dittus et al. | Mar. 23, 1943 |
| 2,337,038 | Fentress | Dec. 21, 1943 |
| 2,414,987 | Tobey et al. | Jan. 28, 1947 |